United States Patent
Kutch

(10) Patent No.: US 9,229,761 B2
(45) Date of Patent: Jan. 5, 2016

(54) GENERATING, AT LEAST IN PART, AT LEAST ONE PACKET INDICATING, AT LEAST IN PART, AT LEAST ONE COMMAND AND/OR ISSUING, AT LEAST IN PART, AT LEAST ONE RESULT OF EXECUTION, AT LEAST IN PART, OF THE AT LEAST ONE COMMAND

(71) Applicant: INTEL CORPORATION, Santa Clara, CA (US)

(72) Inventor: Patrick G. Kutch, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 13/908,379

(22) Filed: Jun. 3, 2013

(65) Prior Publication Data

US 2014/0359611 A1    Dec. 4, 2014

(51) Int. Cl.
*G06F 9/455*    (2006.01)

(52) U.S. Cl.
CPC ........ *G06F 9/45558* (2013.01); *G06F 9/45533* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2008/0162625 A1* | 7/2008 | Sedayao et al. | 709/202 |
| 2011/0004698 A1* | 1/2011 | Wu | 709/235 |
| 2011/0087774 A1* | 4/2011 | Pope et al. | 709/224 |
| 2011/0142053 A1* | 6/2011 | Van Der Merwe et al. | 370/395.1 |
| 2011/0211481 A1* | 9/2011 | Ding et al. | 370/252 |
| 2012/0311208 A1* | 12/2012 | Manula et al. | 710/108 |
| 2013/0086202 A1* | 4/2013 | Connelly et al. | 709/217 |
| 2013/0132944 A1* | 5/2013 | Davis | 718/1 |
| 2014/0130039 A1* | 5/2014 | Chaplik et al. | 718/1 |
| 2014/0282514 A1* | 9/2014 | Carson et al. | 718/1 |
| 2014/0373012 A1* | 12/2014 | Ylitalo et al. | 718/1 |

OTHER PUBLICATIONS

"How to Configure Intel Ethernet Converged Network Adapter-Enabled Virtual Functions on VMware ESXi 5.1," Technical Brief v.1.0, Intel Corporation, Feb. 2013 (26 pages).
"Intel Ethernet X520 Server Adapters," Product Brief, Intel Corporation, 2009 (4 pages).
Krause et al., "I/O Virtualization Architecture Overview," PCI-SIG, 2007 (40 pages).
Tian et al., "Simulate Intel's Next Generation Communication Platform Data Plane Solutions," White Paper, Intel Corporation, Nov. 2012 (18 pages).

\* cited by examiner

Primary Examiner — Kenneth Tang
(74) Attorney, Agent, or Firm — Christopher K. Gagne

(57) ABSTRACT

An embodiment may include circuitry to be included, at least in part, in a node in a network. The circuitry may expose, at least in part, a virtual function (VF) via which a subset of a physical function (PF) of the circuitry may be accessible. The circuitry may generate, at least in part, a packet that may indicate, at least in part, a command, and/or may issue, at least in part, a result of execution of the command by another (external) node in the network. The packet may be received, at least in part, by the other node. The command may be issued to the VF from a virtual machine (VM) resident, at least in part, in the node. The result may be issued, at least in part, to the VM, via the VF. Many modifications, variations, and alternatives are possible without departing from this embodiment.

18 Claims, 3 Drawing Sheets

GENERATING, AT LEAST IN PART, AT LEAST ONE PACKET INDICATING, AT LEAST IN PART, AT LEAST ONE COMMAND AND/OR ISSUING, AT LEAST IN PART, AT LEAST ONE RESULT OF EXECUTION, AT LEAST IN PART, OF THE AT LEAST ONE COMMAND

TECHNICAL FIELD

Embodiments disclosed herein generally relate to generating and/or receiving one or more packets that may be indicate, at least in part, one or more commands, and/or issuing, at least in part, one or more results of execution, at least in part, of the one or more commands.

BACKGROUND

In one conventional virtualized environment, in order to permit a physical network interface device to able to be shared among multiple virtual machines (VM), a virtual machine manager (VMM) assigns to the VM respective virtual functions (VF) of the physical network interface device. These VF correspond to dedicated sets of physical resources or functions of the physical network interface device. If implemented in accordance with Peripheral Component Interconnect (PCI) Special Interest Group (SIG) Single Root Input/Output Virtualization (SR-IOV) and Sharing Specification Revision 1.1, published Jan. 20, 2010 (hereinafter, "SR-IOV specification"), at least a portion of the interactions between a given VF and its assigned VM by-passes direct involvement of the VMM.

Unfortunately, the above conventional technique is limited to use in connection with VM and physical network interface devices that are co-resident in the same host. Thus, in this conventional technique, a VM that resides in one host in a network is not assigned to a VF of a device that resides in another host in the network. Additionally, it would be desirable to be able to implement VF for functions other than and/or in addition to those associated with and/or implemented using network interface devices.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
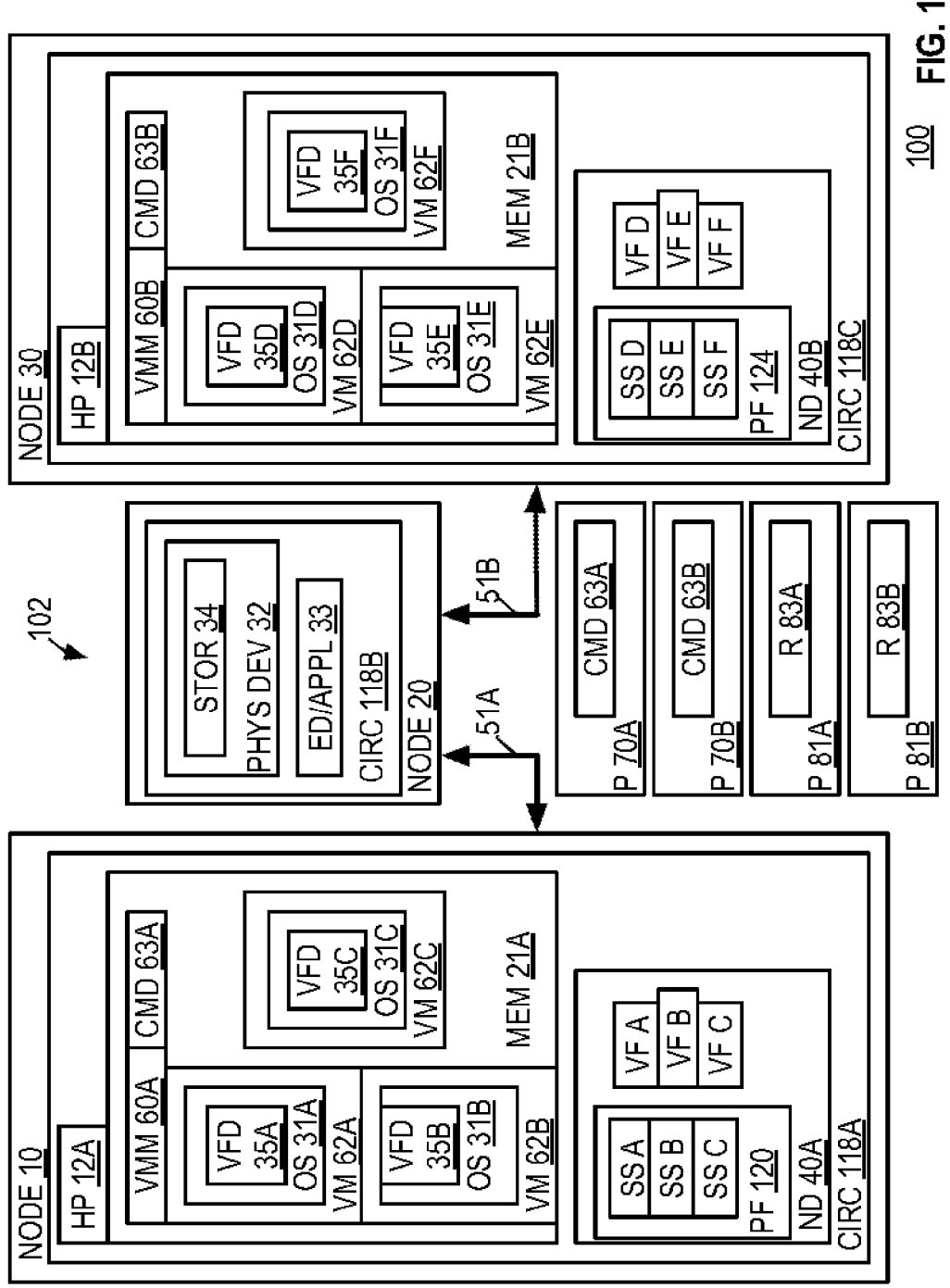
FIG. 1 illustrates elements in an embodiment.

FIG. 1 illustrates a system embodiment 100. System 100 may include, at least in part, network 102. Network 102 may comprise, at least in part, one or more network nodes 10, one or more network nodes 20, and/or one or more network nodes 30. One or more nodes 10 may be communicatively coupled, at least in part, to one or more nodes 20, via one or more network communication links 51A. One or more nodes 20 also may be communicatively coupled, at least in part, to one or more nodes 30, via one or more network communication links 51B.

In this embodiment, a "computer," "host," "server," "client," and/or "node" may be used interchangeably, and may be or comprise, at least in part, one or more end stations, smart phones, tablet computers, appliances, communication instrumentalities, intermediate stations, network interfaces, clients, servers, storage, mass storage, and/or components and/or portions thereof. In this embodiment, a "network," "channel", "communication link," and/or "communication lane" may be used interchangeably, and may be or may comprise, for example, one or more virtual, physical, and/or logical mechanisms, instrumentalities, modalities, and/or portions thereof that may permit, facilitate, and/or allow, at least in part, two or more entities to be communicatively coupled together, at least in part.

In this embodiment, a first entity may be "communicatively coupled" (at least in part) to a second entity if the first entity is capable, at least in part, of transmitting to and/or receiving from the second entity one or more packets. In this embodiment, a packet may comprise, at least in part, one or more symbols, values, and/or characters that may embody, represent, and/or indicate, at least in part, one or more commands and/or data. Also in this embodiment, a "wireless network" may be or comprise a network that permits, at least in part, at least two entities to be wirelessly communicatively coupled, at least in part. In this embodiment, a "wired network" may be or comprise a network that permits, at least in part, at least two entities to be communicatively coupled, at least in part, via non-wireless means, at least in part. In this embodiment, data may be or comprise one or more commands (for example, one or more program instructions), and/or one or more such commands may be or comprise data. Also in this embodiment, an instruction may include data and/or one or more commands. Similarly, in this embodiment, data may include one or more instructions and/or one or more commands.

In this embodiment, a portion, subset, or component of an entity may comprise all or less than all of the entity. Also, in this embodiment, an agent, process, program, driver, operating system (OS), virtual machine (VM), virtual machine monitor (VMM), and/or application may comprise and/or result at least in part from execution of one or more program instructions.

Additionally in this embodiment, a VMM process may be or comprise, at least in part, at least one process involved, at least in part, in managing, controlling, and/or modifying one or more features, functions, and/or operations of one or more VM, one or more portions of one or more VM, and/or circuitry to be used by and/or to be associated with, at least in part, one or more VM. In this embodiment, a VM may be or comprise, at least in part, a node (and/or one or more portions thereof) that may be capable, at least in part, of executing two or more operating systems contemporaneously, at least in part.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. In this embodiment, memory and/or storage each may comprise one or more of the following types of memories: semiconductor firmware memory, programmable memory, non-volatile memory, mass storage, read only memory, electrically programmable memory, random access memory, flash memory, solid state drive memory, hard/fixed disk drive memory, magnetic disk memory, optical disk memory, phase-change memory, and/or other computer-readable and/or writable memory. In this embodiment, mass storage may be or comprise storage that is capable of non-volatile storage of data, and/or from which such data stored therein may be retrieved. Additionally, in this embodiment, a hard/fixed disk drive may be or comprise, for example, one or more platters and/or disks (and/or other circuitry) to and/or from which data may be electrically and/or magnetically stored and/or retrieved, at least in part. Furthermore, in this embodiment, a solid state drive may be or comprise, for example, one or more flash and/or phase-change memory devices (and/or other circuitry) to and/or from which data may be stored and/or retrieved, at least in part.

In this embodiment, one or more nodes 10 may comprise, at least in part, circuitry 118A. Circuitry 118A may comprise, at least in part, one or more single and/or multi-core host processor (HP) CPU 12A, one or more not shown chipsets, one or more not shown user interfaces, one or more computer-readable/writable memories 21A, and/or one or more network devices (ND) 40A (e.g., one or more network interface controllers/interfaces). In this embodiment, the one or more not shown chipsets in one or more nodes 10 may communicatively couple, at least in part, one or more HP 12A, one or more memories 21A, and/or one or more ND 40A. In this embodiment, machine-readable program instructions may be stored, at least in part, in one or more memories 21A. In operation, these instructions may be accessed and executed by circuitry 118A, one or more HP 21A, and/or one or more ND 40A. When so accessed and executed, this may result, at least in part, in these respective components performing the respective operations described herein as being performed by these respective components.

Also, in this embodiment, the one or more not shown user interfaces of one or more nodes 10 may comprise one or more not shown graphical user interface systems. This not shown graphical user interface system each may comprise, e.g., one or more keyboards, pointing devices, and/or display systems that may permit one or more human users (not shown) to interact with, to input commands and/or data into, to receive data from, and/or to monitor, at least in part, one or more operations of system 100 and/or one or more components thereof (e.g., one or more nodes 10).

In this embodiment, one or more nodes 30 may comprise, at least in part, circuitry 118C. Circuitry 118C may comprise, at least in part, one or more single and/or multi-core host processor (HP) CPU 12B, one or more not shown chipsets, one or more not shown user interfaces, one or more computer-readable/writable memories 21B, and/or one or more network devices (ND) 40B. In this embodiment, the one or more not shown chipsets in one or more nodes 30 may communicatively couple, at least in part, one or more HP 12B, one or more memories 21B, and/or one or more ND 40B (e.g., one or more network interface controllers/interfaces). In this embodiment, machine-readable program instructions may be stored, at least in part, in one or more memories 21B. In operation, these instructions may be accessed and executed by circuitry 118C, one or more HP 21B, and/or one or more ND 40B. When so accessed and executed, this may result, at least in part, in these respective components performing the respective operations described herein as being performed by these respective components.

Also, in this embodiment, the one or more not shown user interfaces of one or more nodes 30 may comprise one or more not shown graphical user interface systems. This not shown graphical user interface system each may comprise, e.g., one or more keyboards, pointing devices, and/or display systems that may permit one or more human users (not shown) to interact with, to input commands and/or data into, to receive data from, and/or to monitor, at least in part, one or more operations of system 100 and/or one or more components thereof (e.g., one or more nodes 30).

In this embodiment, one or more nodes 20 may comprise, at least in part, circuitry 118B. Circuitry 118B may comprise, at least in part, one or more external (e.g., with respect to one or more nodes 10, one or more nodes 30, circuitry 118A, and/or circuitry 118C) devices and/or appliances 33 that may be communicatively coupled, at least in part, to one or more physical devices 32. In this example, one or more physical devices 32 may be or comprise, at least in part, storage 34. However, as will be discussed below, alternatively or additionally, one or more devices 32 may be or comprise, at least in part, one or more other and/or additional types of devices (e.g., other than and/or in addition to storage). In this embodiment, a device and/or appliance may be or comprise, at least in part, circuitry capable of (1) performing and/or facilitating performance of, at least in part, one or more functions based, at least in part, one or more commands, and/or (2) issuing and/or indicating, at least in part, one or more results, at least in part, of the performance, at least in part, of these one or more functions.

In this embodiment, in operation, the instructions executed, at least in part, by circuitry 118A, one or more HP 12A, and/or ND 40A may result, at least in part, one or more VMM processes/VMM 60A, one or more VM 62A, one or more VM 62B, and/or one or more VM 62C being executed by and/or resident in, at least in part, one or more nodes 10. One or more VM 62A may comprise, at least in part, one or more OS 31A. One or more VM 62B may comprise, at least in part, one or more OS 31B. One or more VM 62C may comprise, at least in part, one or more OS 31C. One or more OS 31A may comprise, at least in part, one or more virtual function drivers (VFD) 35A. One or more OS 31B may comprise, at least in part, one or more virtual function drivers (VFD) 35B. One or more OS 31C may comprise, at least in part, one or more virtual function drivers (VFD) 35C.

In this embodiment, one or more ND 40A may comprise one or more physical functions (PF) 120. In this embodiment, one or more PF 120 may be or comprise, at least in part, (1) one or more portions of physical circuitry that may be comprised, at least in part, in one or more ND 40A, and/or (2) one or more operations, and/or features implemented, accessible, and/or performed, at least in part, by, and/or resource comprised in, at least in part, such one or more portions of such physical circuitry. For example, in this embodiment, one or more PF 120 may comprise, at least in part, one or more base address control registers, operative circuitry, and/or other circuitry that may permit and/or facilitate, at least in part, communication and/or interaction with, at least in part, and/or control of, at least in part, one or more appliances 33. For example, as will be described below, such communication, interaction, and/or control may be, comprise, permit, and/or facilitate, at least in part, communication of (1) one or more packets 70A and/or commands 63A to one or more nodes 20, circuitry 118B, and/or appliances 33, and/or (2) one or more packets 81A and/or results 83A of execution of one or more commands 63A by one or more nodes 20, appliances 33, physical devices 32, circuitry 118B, and/or storage 34.

In this embodiment, one or more VMM 60A may issue, at least in part, one or more commands to VM 62A, 62B, 62C, circuitry 118A, and/or ND 40A that may result, at least in part, in one or more ND 40A exposing, at least in part, to VM 62A, 62B, and/or 62C, one or more (and in this embodiment, a plurality of) virtual functions (VF) A, B, and/or C via which one or more (and in this embodiment, a plurality of) subsets (SS) A, B, and/or C of one or more PF 120 may be accessible, at least in part, to VM 62A, 62B, and/or 62C. In this embodiment, exposing a function may be, involve, comprise, facilitate, concern, and/or permit, at least part, (1) making the function available, at least in part, for use and/or access, at least in part, (2) permitting and/or facilitating, at least in part, the use and/or access, at least in part, of such function, and/or (3) assigning, at least in part, exclusively or non-exclusively, at least in part, the function for such use and/or access. These one or more commands issued, at least in part, by one or more VMM 60A also may result, at least in part, in (1) assignment and/or allocation (exclusively or non-exclusively), at least in part, of subsets A, B, and/or C to these VF A, B, and/or C, respectively, and/or (2) assignment and/or allocation (e.g., for exclusive or non-exclusive use and/or access), at least in part, of these VF A, B, and/or C to VM 62A, 62B, and/or 62C, respectively. In this embodiment, a VF may be, comprise, interface with, and/or facilitate use of and/or access to, at least in part, one or more subsets of one or more PF.

Also in this embodiment, one or more ND 40B may comprise one or more PF 124. In this embodiment, one or more PF 124 may be or comprise, at least in part, (1) one or more portions of physical circuitry that may be comprised, at least in part, in one or more ND 40B, and/or (2) one or more operations and/or features implemented, accessible, and/or performed, at least in part, by such one or more portions of such physical circuitry. For example, in this embodiment, one or more PF 124 may comprise, at least in part, one or more base address registers, control registers, operative circuitry, and/or other circuitry that may permit and/or facilitate, at least in part, communication and/or interaction with, at least in part, and/or control of, at least in part, one or more appliances 33. For example, as will be described below, such communication, interaction, and/or control may be, comprise, permit, and/or facilitate, at least in part, communication of (1) one or more packets 70B and/or commands 63B to one or more nodes 20, circuitry 118B, and/or appliances 33, and/or (2) one or more packets 81B and/or results 83B of execution of one or more commands 63B by one or more nodes 20, appliances 33, physical devices 32, circuitry 118B, and/or storage 34. In this embodiment, one or more VMM 60B may issue one or more commands to VM 62D, 62E, and/or 62F, circuitry 118C, and/or ND 40B that may result, at least in part, in one or more ND 40B exposing, at least in part, to VM 62D, 62E, and/or 62F, one or more (and in this embodiment, a plurality of) VF D, VF E, and/or VF F via which one or more (and in this embodiment, a plurality of) subsets (SS) D, E, and/or F of one or more PF 124 may be accessible, at least in part, to VM 62D, 62E, and/or 62F. These one or more commands issued, at least in part, by one or more VMM 60B also may result, at least in part, in (1) assignment and/or allocation (exclusively or non-exclusively), at least in part, of subsets D, E, and/or F to these VF D, E, and/or F, respectively, and/or (2) assignment and/or allocation (e.g., for exclusive or non-exclusive use and/or access), at least in part, of these VF D, E, and/or F to VM 62D, 62E, and/or 62F, respectively.

In this embodiment, communication between one or more nodes 10 and/or one or more nodes 20 via one or more links 51A, and/or communication between one or more nodes 30 and/or one or more nodes 20 via one or more links 51B, may comply and/or be compatible with one or more communication protocols. For example, these one or more communication protocols may comply and/or be compatible with, at least in part, the Ethernet protocol described in Institute of Electrical and Electronics Engineers, Inc. (IEEE) Std. 802.3, 2000 Edition, published on Oct. 20, 2000. Additionally or alternatively, these one or more communication protocols may comply and/or be compatible with the Transmission Control Protocol and/or Internet Protocol described in Internet Engineering Task Force (IETF) Request For Comments (RFC) 791 and/or 793, published September 1981. Of course, many different, additional, and/or other protocols may be used for such data and/or command exchange without departing from this embodiment, including for example, later-developed versions and/or updates of the aforesaid and/or other protocols. Additionally or alternatively, in this embodiment, (1) the exposing, at least in part, of the VF A, B, C, D, E, and/F, (2) the interactions of these VF with VMM 60A and/or 60B and/or VFD 35A, 35B, 35C, 35D, 35E, and/or 35F, and/or (3) the assignment/allocation of these VF to VMM and/or of subsets A, B, C, D, E, and/or F to VF A, B, C, D, E, and/or F, respectively, may comply and/or be compatible with, at least in part, the SR-IOV specification.

Figure 3:
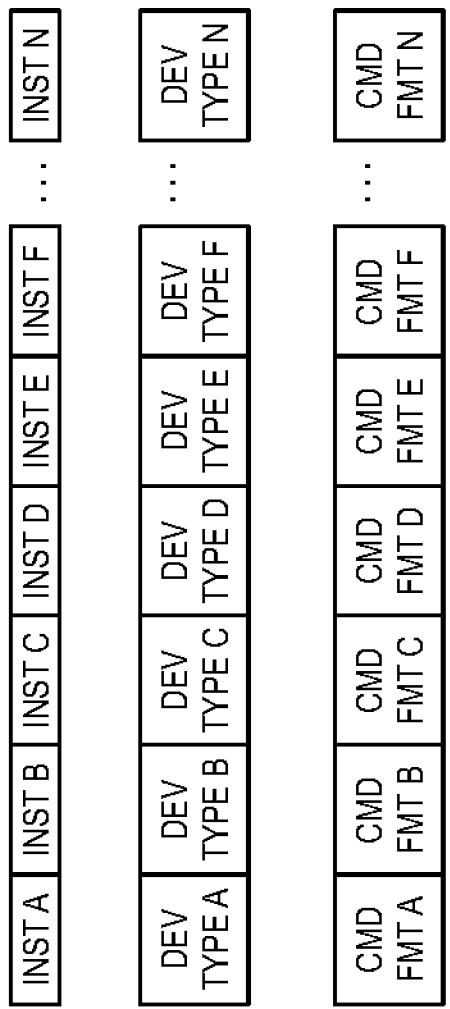
FIG. 3 illustrates elements in an embodiment.
Figure 3:
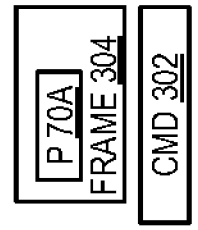

In operation of this embodiment, VMM 60A and/or VMM 60B may be capable, at least in part, of providing one or more commands (e.g., commands 302 shown in FIG. 3) to VFD 35A, 35B, and/or 35C in one or more nodes 10 and/or VFD 35D, 35E, and/or 35F in one or more nodes 30, respectively. These VFD 35A, 35B, 35C, 35D, 35E, and/or 35F may be instantiated, based at least in part, upon these one or more commands 302, as one or more possible respective instantiations selected from a plurality of possible instantiations INST A . . . N (see FIG. 3). Each of these possible instantiations INST A . . . N may be associated, at least in part, with different (e.g., respective) types DEV TYPE A . . . N of devices that may be associated with and/or may be capable of processing, at least in part, different command formats (e.g., commands having formats that may be mutually different from each other, at least in part) CMD FMT A . . . N. When instantiated in respective of these possible instantiations INST A . . . N, the VFD 35A, 35B, 35C, 35D, 35E, and/or 35F may present themselves, at least in part, to the respective VMM 60A and/or 60B with which they may be associated, as respective of the different device types DEV TYPE A . . . N that may be associated, at least in part, with the respective possible instantiations INST A . . . N. These different types DEV TYPE A . . . N of devices may be capable of providing and/or facilitating provision, at least in part, of different types of services, such as, for example, storage, video, audio, multimedia, encryption, decryption, and/or bus communication services. As a result and/or as part of, at least in part, such instantiation, the circuitry 118A and/or 118C may expose, at least in part, one or more subsets of the VF A . . . F to the OS 31A . . . 31F and/or VM 62A . . . 62F as facilitating, at least in part, provision of these different types of services. This may facilitate, at least in part, (1) execution, at least in part, of one or more commands 63A and/or 63B and/or (2) issuance, at least in part, of one or more results 83A and/or 83B, by one or more nodes 20, appliances 33, devices 32, and/or storage 34. In this embodiment, instantiation may comprise, embody, facilitate, result in, and/or result from, at least in part, configuration and/or binding of particular data, variables, values, functions, operations, and/or characteristics.

For example, in this embodiment, one or more appliances 33, devices 32, and/or storage 34 may be of one or more device types (e.g., DEV TYPE A) that may be capable of executing, at least in part, one or more commands 63A, if one or more commands 63A are compatible with, at least in part, one or more command formats CMD FMT A. In this example, VMM 60A may issue, at least in part, one or more commands 302 that may result, at least in part, in one or more of the VFD (e.g., one or more VFD 35A) being instantiated as one or more possible instantiations (e.g., INST A) selected from the possible instantiations INST A . . . N. One or more instantiations INST A may be associated with, at least in part, one or more device types DEV TYPE A that may be capable, at least in part, of executing, at least in part, one or more commands that may be compatible, at least in part, with one or more command formats CMD FMT A. As a result, at least in part, of being instantiated as one or more instantiations INST A, one or more VFD 35A may present themselves, at least in part, to one or more VM 62A, OS 31A, and/or circuitry 118A as one or more devices of the same (or compatible) type as the one or more appliances 33, devices 32, and/or storage 34 (e.g., of type DEV TYPE A). Alternatively, without departing from this embodiment, depending upon, for example, the particular device type of the one or more appliances 33, devices 32, and/or storage 34, the one or more commands 63A may result, at least in part, in instantiation of one or more VFD 35A as one or more other of the possible instantiations INST B . . . N. In this alternative, depending upon the particular instantiation of one or more VFD 35A, one or more VFD 35A may present themselves, at least in part, as one or more other types of devices DEV TYPE B . . . N associated with such instantiation.

Also, for example, in this embodiment, one or more appliances 33, devices 32, and/or storage 34 may be of one or more device types (e.g., DEV TYPE A) that may be capable of executing, at least in part, one or more commands 63B, if one or more commands 63B are compatible with, at least in part, one or more command formats CMD FMT A. In this example, VMM 60B may issue, at least in part, one or more commands 302 that may result, at least in part, in one or more of the VFD (e.g., one or more VFD 35D) being instantiated as one or more possible instantiations (e.g., INST A) selected from the possible instantiations INST A . . . N. One or more instantiations INST A may be associated with, at least in part, one or more device types DEV TYPE A that may be capable, at least in part, of executing, at least in part, one or more commands that may be compatible, at least in part, with one or more command formats CMD FMT A. As a result, at least in part, of being instantiated as one or more instantiations INST A, one or more VFD 35D may present themselves, at least in part, to one or more VM 62D, OS 31D, and/or circuitry 118C as one or more devices of the same (or compatible) type as the one or more appliances 33, devices 32, and/or storage 34 (e.g., of type DEV TYPE A). Alternatively, without departing from this embodiment, depending upon, for example, the particular device type of the one or more appliances 33, devices 32, and/or storage 34, the one or more commands 63B may result, at least in part, in instantiation of one or more VFD 35D as one or more other of the possible instantiations INST B . . . N. In this alternative, depending upon the particular instantiation of one or more VFD 35D, one or more VFD 35D may present themselves, at least in part, as one or more other types of devices DEV TYPE B . . . N associated with such instantiation.

Figure 2:
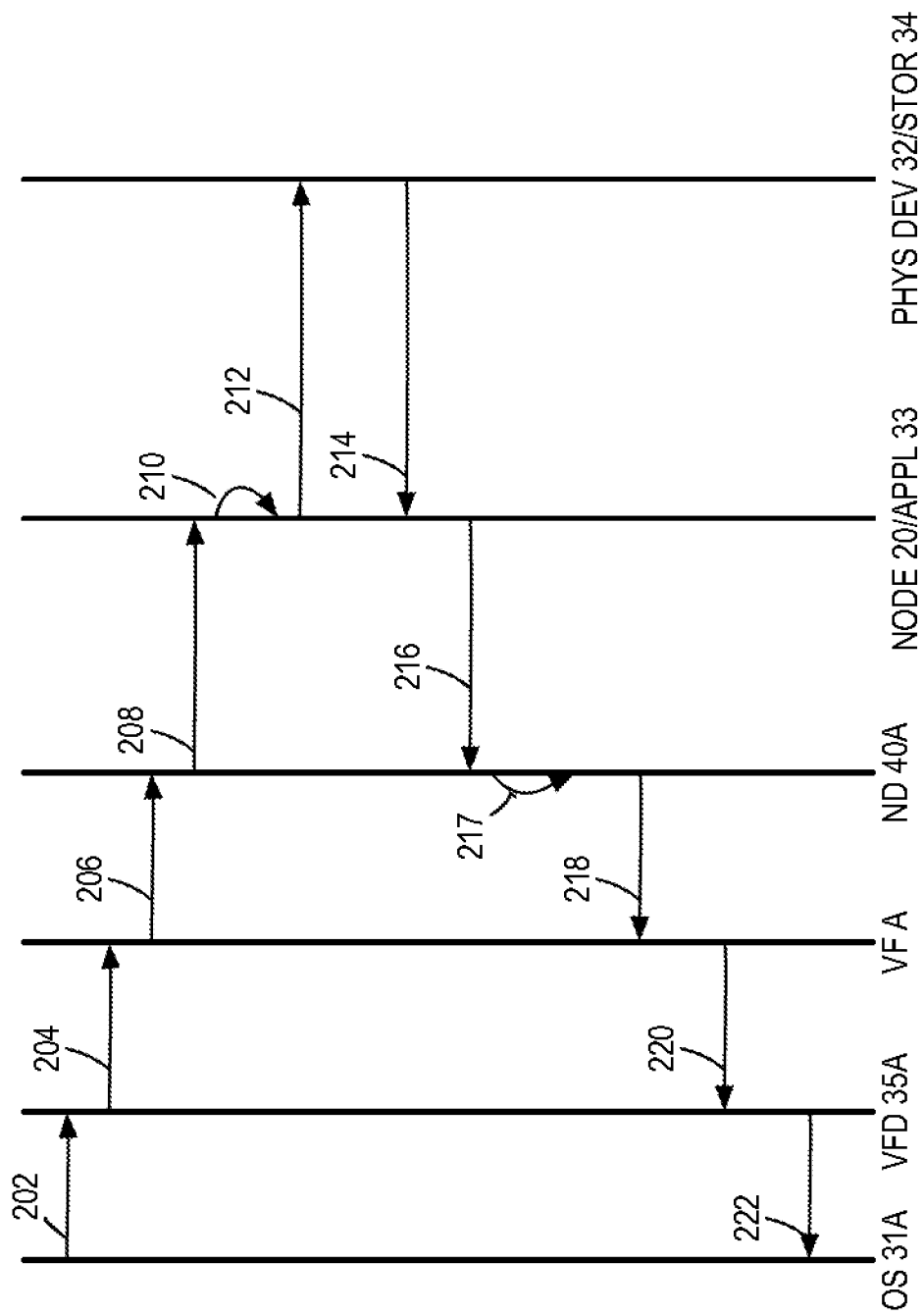
FIG. 2 illustrates elements in an embodiment.

For example, as shown in FIG. 2, after VMM 60A has issued, at least in part, commands to the VM 62A . . . 62C, OS 31A . . . 31C, circuitry 118A, and/or ND 40A that may result, at least in part, in appropriately exposing, at least in part, of the VF A . . . VF C, allocation, at least in part, of the SS A . . . SS C, and/or instantiation, at least in part, of the VFD 35A . . . 35C in one or more nodes 10, operations 200 may be performed, at least in part. For example, as part of operations 200, circuitry 118A, one or more OS 31A, and/or VM 62A may generate and/or issue, at least in part, one or more commands 63A to one or more VFD 35A. In this example, one or more commands 63A may be or comprise, at least in part, one or more commands to read one or more portions of one or more physical storage devices (e.g., corresponding, at least in part, to and/or accessible via, at least in part, one or more devices of the same or compatible type as one or more appliances 33, devices 32, and/or storage 34), as illustrated by one or more operations 202 in FIG. 2. In response, at least in part, to one or more commands 63A, one or more VFD 35A may generate, at least in part, one or more packets 70A that may encapsulate and/or indicate, at least in part, one or more commands 63A, and/or may perform, at least in part, one or more direct memory access (DMA) operations to issue, at least in part, these one or more packets 70A to one or more VF A, as illustrated by one or more operations 204 in FIG. 2. In response, at least in part, to one or more packets 70A, one or more VF A, one or more SS A, and/or ND 40A may generate (as illustrated by one or more operations 206), at least in part, and/or issue (as illustrated by one or more operations 208), at least in part, one or more frames 304 (see FIG. 3) to one or more nodes 20, circuitry 118B, and/or one or more appliances 33. One or more frames 304 may comprise, encapsulate, and/or indicate, at least in part, one or more packets 70A. One or more frames 304 may be or comprise, at least in part, one or more Ethernet frames (e.g., compatible, at least in part, with the Ethernet protocol). In this embodiment, one or more operations 206 and/or 208 may be carried out, at least in part, via one or more hardware offload operations that may not involve and/or utilize, at least in part, processing overhead and/or CPU cycles of one or more HP 12A.

In response, at least in part, to one or more frames 304, one or more appliances 33 and/or circuitry 118B may de-encapsulate and/or decode, at least in part, one or more packets 70A and/or commands 63A from one or more frames 304, and these one or more commands 63A may be provided, at least in part, to one or more physical devices 32 and/or storage 34 for execution, at least in part, as illustrated by one or more operations 210. In response, at least in part, one or more physical devices 32 and/or storage 34 may execute, at least in part, one or more commands 63A, as illustrated by one or more operations 212. As stated previously, in this example, one or more commands 63A may be or comprise one or more read commands. Accordingly, one or more results 83A of executing, at least in part, one or more commands 63A may be or comprise, at least in part, data read from one or more devices 32 and/or storage 34. One or more devices 32 and/or storage 34 may provide, at least in part, these one or more results 83A to one or more appliances 33, as illustrated by one or more operations 214. In response, at least in part, to these one or more results 83A, one or more appliances 33 may generate and/or issue, at least in part, one or more packets 81A to one or more nodes 10, circuitry 118A, and/or ND 40A that may encapsulate, comprise, and/or indicate, at least in part, one or more results 83A (e.g., in one or ore not shown Ethernet frames), as illustrated by one or more operations 216. In response, at least in part, to one or more packets 81A, circuitry 118A may de-encapsulate and/or decode (as illustrated by one or more operations 217), at least in part, one or more packets 81A and/or results 83A, and/or these may be provided, at least in part, to one or more VF A, as illustrated by one or more operations 218. One or more VF A may issue, at least in part, these one or more results 83A to one or more VFD 35A, OS 31A, and/or VM 62A via one or more DMA operations, as illustrated by one or more operations 220, and/or one or more VFD 35A may issue, at least in part, these one or more results 83A to one or more OS 31A and/or VM 62A.

Also, for example, after VMM 60B has issued, at least in part, commands to the VM 62D . . . 62F, OS 31D . . . 31F, circuitry 118C, and/or ND 40B that may result, at least in part, in appropriately exposing, at least in part, of the VF D . . . VF F, allocation, at least in part, of the SS D . . . SS F, and/or instantiation, at least in part, of the VFD 35D . . . 35F in one or more nodes 30, operations that may be analogous, at least in part, to operations 200 may be performed, at least in part, in connection with one or more commands 63B, packets 70B, packets 81B, and/or results 83B. Of course, without departing from this embodiment, depending upon the particular device type of the one or more appliances 33, devices 32, and/or storage 34, other types of operations may be carried out, at least in part, for example, for the purpose of carrying out and/or facilitating other types of storage and/or other services (e.g., video, audio, multimedia, encryption, decryption, security, bus communication, and/or other services).

Thus, in this embodiment, generic DMA operations may be used to transport commands 63A and/or 63B between appropriate VF and/or VFD in order permit and/or facilitate, at least in part, execution, at least in part, of such commands remotely from the compute nodes 10, 30 that may comprise, at least in part, such VF and/or VFD. Advantageously, since these commands may be executed, at least in part, at one or more nodes 20 that may be remote/external from such compute nodes 10, 30, the one or more remote nodes 20 and/or components (e.g., one or more appliances 33, devices 32, and/or storage 34, etc.) may be dynamically modified, added, and/or removed, in this embodiment, without necessarily involving, at least in part, reboot and/or restart of the compute nodes 10, 30 for reconfiguration and/or re-provisioning.

Thus, in a first example in this embodiment, an apparatus may be provided that is to be used in association with at least one node in a network. The apparatus may comprise circuitry to be comprised, at least in part, in the at least one node. The circuitry may expose, at least in part, at least one virtual function via which at least one subset of at least one physical function of the circuitry may be accessible. The circuitry may satisfy the following conditions (a) and/or (b). In condition (a), the circuitry may generate, at least in part, at least one packet to be received, at least in part, by at least one other node in the network. The at least one other node may be external to the at least one node. The at least one packet may indicate, at least in part, at least one command issued to the at least one virtual function from at least one virtual machine that is to be resident, at least in part, in the at least one node. The at least one other node may execute, at least in part, the at least one command. In condition (b), the circuitry may issue, at least in part, to the at least one virtual machine, via the at least one virtual function, at least one result of execution, at least in part, of the at least one command by the at least one other node.

In a second example of this embodiment that may comprise some or all of the elements of the first example, the at least one virtual machine may comprise, at least in part, at least one driver to issue, at least in part, at least one other packet to the at least one virtual function via at least one direct memory access operation. In this second example, the at least one other packet may indicate, at least in part, the at least one command.

In a third example of this embodiment that may comprise some or all of the elements of the first and/or second examples, the at least one virtual machine may comprise, at least in part, the at least one driver to receive, at least in part, at least one other packet from the at least one virtual function via at least one direct memory access operation. In this third example, the at least one other packet may indicate, at least in part, the at least one result.

In a fourth example of this embodiment that may comprise some or all of the elements of any of the preceding examples, the at least one other node may comprise, at least in part, at least one appliance of a type that may be capable of executing, at least in part, the at least one command. The apparatus may comprise at least one virtual function driver to be instantiated, based at least in part upon at least one other command from a virtual machine monitor, as at least one possible instantiation selected from a plurality of possible instantiations. The at least one possible instantiation may result, at least in part, in the at least one driver presenting itself, at least in part, to the at least one virtual machine as at least one device of the type of the at least one appliance.

In a fifth example of this embodiment that may comprise some or all of the elements of the fourth example, the plurality of possible instantiations may be associated, at least in part, with different types of devices that may be associated, at least in part, with different command formats. When instantiated in respective of the possible instantiations, the at least one driver may present itself, at least in part, to the at least one virtual machine as respective of the different types of devices associated, at least in part, with the respective of the possible instantiations.

In a sixth example of this embodiment that may comprise some or all of the elements of any of the preceding examples, the circuitry may expose, at least in part, a plurality of virtual functions to facilitate, at least in part, provision of at least one of the following services: storage, video, audio, multimedia, encryption, decryption, and bus communication. In a seventh example of this embodiment that may comprise some or all of the elements of any of the preceding examples, the at least one packet may be comprised, at least in part, in at least one Ethernet frame, and the at least one virtual function may be exposed, at least in part, in a manner that may be compatible, at least in part, with single root input/output virtualization and sharing.

In an eighth example of this embodiment, computer-readable memory may be provided that may store one or more instructions that when executed by a machine results in the performance of operations that may comprise any combination of any of the operations performed by the circuitry and/or apparatus in any of the preceding examples. In a ninth example of this embodiment, a method is provided that may be implemented, at least in part, in a network. The method of this ninth example may comprise (1) any combination of any of the operations performed by the circuitry and/or apparatus in any of the preceding examples, and/or (2) any combination of any of the operations that may be performed by execution of the one or more instructions stored in the computer-readable memory of the eighth example of this embodiment. In a tenth example of this embodiment, means may be provided to carry out any of, and/or any combination of, the operations that may be performed by the method, apparatus, computer-readable memory, and/or circuitry in any of the preceding examples.

Advantageously, this embodiment is not limited to use in connection with VM and physical network interface devices that are co-resident in the same node. Advantageously, in this embodiment, a VM that resides in one node in a network may be assigned to use and/or access a VF that may be associated with and/or used to access a device that may reside in another node in the network. Further advantageously, in this embodiment, one or more VF may be implemented that may be for functions other than and/or in addition to those associated with and/or implemented merely using network interface devices.

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Accordingly, the claims are intended to embrace all such alternatives, modifications, and/or variations.

What is claimed is:

1. An apparatus to be used in association with at least one node in a network, the apparatus comprising:
   circuitry to be comprised, at least in part, in the at least one node, the circuitry to expose, at least in part, at least one virtual function via which at least one subset of at least one physical function of the circuitry is accessible, the circuitry to perform at least one of the following subparagraphs (a) and (b):
   (a) generate, at least in part, at least one packet to be received, at least in part, by at least one other node in the network, the at least one other node being external to the at least one node, the at least one packet indicating, at least in part, at least one command issued to the at least one virtual function from at least one virtual machine that is to be resident, at least in part, in the at least one node, the at least one other node to execute, at least in part, the at least one command; and
   (b) issue, at least in part, to the at least one virtual machine, via the at least one virtual function, at least one result of execution, at least in part, of the at least one command by the at least one other node;
   wherein:
   the at least one other node comprises, at least in part, at least one appliance of at least one certain device type that is capable of executing, at least in part, at least one command type that is compatible with, at least in part, at least one command format;
   the at least one command format is at least one of a plurality of possible command formats;
   the possible command formats are mutually, respectively, different from each other, at least in part;
   the apparatus comprises at least one virtual function driver to be instantiated, based at least in part upon at least one other command from a virtual machine monitor, as at least one possible instantiation selected from a plurality of possible instantiations;
   the plurality of possible instantiations are associated, at least in part, with different device types that are respectively associated, at least in part, with the mutually different possible command formats; and
   the at least one possible instantiation is associated, at least in part, with at least one other device type that is different, at least in part, from the at least one certain device type of the at least one appliance.

2. The apparatus of claim 1, wherein:
the at least one virtual machine comprises, at least in part, the at least one driver and the at least one driver is to issue, at least in part, at least one other packet to the at least one virtual function via at least one direct memory access operation; and
the at least one other packet indicates, at least in part, the at least one command.

3. The apparatus of claim 1, wherein:
the at least one virtual machine comprises, at least in part, the at least one driver and the at least one driver is to receive, at least in part, at least one other packet from the at least one virtual function via at least one direct memory access operation; and
the at least one other packet indicates, at least in part, the at least one result.

4. The apparatus of claim 1, wherein:
the at least one possible instantiation results, at least in part, in the at least one driver presenting itself, at least in part, to the at least one virtual machine as at least one device of the at least one other device type.

5. The apparatus of claim 1, wherein:
the circuitry is to expose, at least in part, a plurality of virtual functions to facilitate, at least in part, provision of at least one of the following services: storage, video, audio, multimedia, encryption, decryption, and bus communication.

6. The apparatus of claim 1, wherein:
the at least one packet is comprised, at least in part, in at least one Ethernet frame; and
the at least one virtual function is exposed, at least in part, in a manner that is compatible, at least in part, with single root input/output virtualization and sharing.

7. Computer-readable memory storing one or more instructions that when executed by a machine result in performance of operations comprised in at least one of the following subparagraphs (a) and (b):
   (a) generating, at least in part, by circuitry to be comprised at least in part in at least one node in a network, at least one packet to be received, at least in part, by at least one other node in the network, the circuitry to expose, at least in part, at least one virtual function via which at least one subset of at least one physical function of the circuitry is accessible, the at least one other node being external to the at least one node, the at least one packet indicating, at least in part, at least one command issued to the at least one virtual function from at least one virtual machine that is to be resident, at least in part, in the at least one node, the at least one other node to execute, at least in part, the at least one command; and
   (b) issuing, at least in part, to the at least one virtual machine, via the at least one virtual function, at least one result of execution, at least in part, of the at least one command by the at least one other node;
   wherein:
   the at least one other node comprises, at least in part, at least one appliance of at least one certain device type that is capable of executing, at least in part, at least one command type that is compatible with, at least in part, at least one command format;
   the at least one command format is at least one of a plurality of possible command formats;
   the possible command formats are mutually, respectively, different from each other, at least in part;
   the apparatus comprises at least one virtual function driver to be instantiated, based at least in part upon at least one other command from a virtual machine monitor, as at least one possible instantiation selected from a plurality of possible instantiations;
   the plurality of possible instantiations are associated, at least in part, with different device types that are respectively associated, at least in part, with the mutually different possible command formats; and
   the at least one possible instantiation is associated, at least in part, with at least one other device type that is different, at least in part, from the at least one certain device type of the at least one appliance.

8. The computer-readable memory of claim 7, wherein:
the at least one virtual machine comprises, at least in part, the at least one driver and the at least one driver is to issue, at least in part, at least one other packet to the at least one virtual function via at least one direct memory access operation; and
the at least one other packet indicates, at least in part, the at least one command.

9. The computer-readable memory of claim 7, wherein:
the at least one virtual machine comprises, at least in part, the at least one driver and the at least one driver is to receive, at least in part, at least one other packet from the at least one virtual function via at least one direct memory access operation; and
the at least one other packet indicates, at least in part, the at least one result.

10. The computer-readable memory of claim 7, wherein:
the at least one possible instantiation results, at least in part, in the at least one driver presenting itself, at least in part, to the at least one virtual machine as at least one device of the at least one other device type.

11. The computer-readable memory of claim 7, wherein:
the circuitry is to expose, at least in part, a plurality of virtual functions to facilitate, at least in part, provision of at least one of the following services: storage, video, audio, multimedia, encryption, decryption, and bus communication.

12. The computer-readable memory of claim 7, wherein:
the at least one packet is comprised, at least in part, in at least one Ethernet frame; and
the at least one virtual function is exposed, at least in part, in a manner that is compatible, at least in part, with single root input/output virtualization and sharing.

13. A method implemented, at least in part, in a network, the method comprising at least one of the following paragraphs (a) and (b):
(a) generating, at least in part, by circuitry to be comprised at least in part in at least one node in the network, at least one packet to be received, at least in part, by at least one other node in the network, the circuitry to expose, at least in part, at least one virtual function via which at least one subset of at least one physical function of the circuitry is accessible, the at least one other node being external to the at least one node, the at least one packet indicating, at least in part, at least one command issued to the at least one virtual function from at least one virtual machine that is to be resident, at least in part, in the at least one node, the at least one other node to execute, at least in part, the at least one command; and
(b) issuing, at least in part, to the at least one virtual machine, via the at least one virtual function, at least one result of execution, at least in part, of the at least one command by the at least one other node;

wherein:
the at least one other node comprises, at least in part, at least one appliance of at least one certain device type that is capable of executing, at least in part, at least one command type that is compatible with, at least in part, at least one command format;
the at least one command format is at least one of a plurality of possible command formats;
the possible command formats are mutually, respectively, different from each other, at least in part;
the apparatus comprises at least one virtual function driver to be instantiated, based at least in part upon at least one other command from a virtual machine monitor, as at least one possible instantiation selected from a plurality of possible instantiations;
the plurality of possible instantiations are associated, at least in part, with different device types that are respectively associated, at least in part, with the mutually different possible command formats; and
the at least one possible instantiation is associated, at least in part, with at least one other device type that is different, at least in part, from the at least one certain device type of the at least one appliance.

14. The method of claim 13, wherein:
the at least one virtual machine comprises, at least in part, the at least one driver and the at least one driver is to issue, at least in part, at least one other packet to the at least one virtual function via at least one direct memory access operation; and
the at least one other packet indicates, at least in part, the at least one command.

15. The method of claim 13, wherein:
the at least one virtual machine comprises, at least in part, the at least one driver and the at least one driver is to receive, at least in part, at least one other packet from the at least one virtual function via at least one direct memory access operation; and
the at least one other packet indicates, at least in part, the at least one result.

16. The method of claim 13, wherein:
the at least one possible instantiation results, at least in part, in the at least one driver presenting itself, at least in part, to the at least one virtual machine as at least one device of the at least one other device type.

17. The method of claim 13, wherein:
the circuitry is to expose, at least in part, a plurality of virtual functions to facilitate, at least in part, provision of at least one of the following services: storage, video, audio, multimedia, encryption, decryption, and bus communication.

18. The method of claim 13, wherein:
the at least one packet is comprised, at least in part, in at least one Ethernet frame; and
the at least one virtual function is exposed, at least in part, in a manner that is compatible, at least in part, with single root input/output virtualization and sharing.

* * * * *